US011422996B1

(12) United States Patent
Muhlstein et al.

(10) Patent No.: US 11,422,996 B1
(45) Date of Patent: Aug. 23, 2022

(54) JOINT EMBEDDING CONTENT NEURAL NETWORKS

(71) Applicant: Snap Inc., Santa Monica, CA (US)

(72) Inventors: Lawrence Jason Muhlstein, San Diego, CA (US); Leonardo Ribas Machado das Neves, Marina Del Rey, CA (US); Yanen Li, Los Angeles, CA (US); Ning Xu, Irvine, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/396,119

(22) Filed: Apr. 26, 2019

Related U.S. Application Data

(60) Provisional application No. 62/663,103, filed on Apr. 26, 2018.

(51) Int. Cl.
*G06F 16/22* (2019.01)
*G06N 3/08* (2006.01)
*G06F 3/0481* (2022.01)
*G06F 3/0488* (2022.01)

(52) U.S. Cl.
CPC ............ *G06F 16/22* (2019.01); *G06F 3/0481* (2013.01); *G06N 3/08* (2013.01); *G06F 3/0488* (2013.01)

(58) Field of Classification Search
CPC ...... G06F 16/22; G06F 3/0481; G06F 3/0488; G06N 3/08
See application file for complete search history.

(56) References Cited

U.S. PATENT DOCUMENTS

| | | | | | |
|---|---|---|---|---|---|
| 6,029,195 | A | * | 2/2000 | Herz | G06Q 30/02 725/116 |
| 7,606,772 | B2 | * | 10/2009 | Flinn | G06N 20/00 706/12 |
| RE44,559 | E | * | 10/2013 | Flinn | 706/12 |
| 8,600,920 | B2 | * | 12/2013 | Flynn | G06N 5/048 706/45 |
| RE44,966 | E | * | 6/2014 | Flinn | 706/12 |
| RE44,967 | E | * | 6/2014 | Flinn | 706/12 |
| RE44,968 | E | * | 6/2014 | Flinn | 706/12 |
| 9,787,785 | B2 | * | 10/2017 | Liu | G06F 16/4393 |
| 10,430,838 | B1 | * | 10/2019 | Andreou | G06F 40/166 |
| 10,579,869 | B1 | * | 3/2020 | Xiong | G06F 3/048 |
| 10,614,342 | B1 | * | 4/2020 | Lorbert | G06K 9/00362 |
| 2006/0200433 | A1 | * | 9/2006 | Flinn | G06N 20/00 706/12 |

(Continued)

OTHER PUBLICATIONS

Chen, Xu, "Sequential Recommendation with User Memory Networks", Proc. of the 11th ACM Intl. Conference on Web Searching and Data Mining, (2018), 90 pgs.

(Continued)

*Primary Examiner* — Kieu D Vu
*Assistant Examiner* — Alvaro R Calderon, IV
(74) *Attorney, Agent, or Firm* — Schwegman Lundberg & Woessner, P.A.

(57) ABSTRACT

A neural network system can select content based on user and item content embeddings in an approach that can be updated in real time on the user device without server support. Requests for content sent to the server can include an anonymous user embedding that includes data describing the user's inputs. The content that is nearest to the user embedding in a joint embedding space can be returned as suggested content.

19 Claims, 17 Drawing Sheets

(56) References Cited

U.S. PATENT DOCUMENTS

| | | | | |
|---|---|---|---|---|
| 2006/0200435 A1* | 9/2006 | Flinn | ...................... | G06N 20/00 706/12 |
| 2007/0203872 A1* | 8/2007 | Flinn | ........................ | G06N 7/02 706/62 |
| 2008/0209349 A1* | 8/2008 | Macadaan | ........... | G06F 16/9535 715/762 |
| 2009/0012841 A1* | 1/2009 | Saft | ........................ | G06Q 30/02 705/7.29 |
| 2009/0144075 A1* | 6/2009 | Flinn | ........................ | G06N 7/02 705/318 |
| 2010/0306249 A1* | 12/2010 | Hill | ........................ | G06Q 50/01 707/769 |
| 2011/0258049 A1* | 10/2011 | Ramer | ............... | G06Q 30/0273 705/14.66 |
| 2014/0052527 A1* | 2/2014 | Roundtree | ......... | G06Q 30/0245 705/14.44 |
| 2016/0034425 A1* | 2/2016 | Liu | ....................... | G06F 16/435 715/202 |
| 2016/0170982 A1* | 6/2016 | Djuric | .................. | G06F 16/353 707/740 |
| 2016/0188592 A1* | 6/2016 | Fergus | ................. | G06F 16/437 707/738 |
| 2016/0188724 A1* | 6/2016 | Fergus | ................... | G06Q 50/01 707/738 |
| 2016/0321522 A1* | 11/2016 | Yuan | ..................... | G06N 3/0454 |
| 2017/0269791 A1* | 9/2017 | Meyerzon | ............. | G06F 3/0481 |
| 2018/0137143 A1* | 5/2018 | Brundage | ............... | G06K 9/626 |
| 2018/0137404 A1* | 5/2018 | Fauceglia | ............ | G06N 3/0445 |
| 2018/0157638 A1* | 6/2018 | Li | ............................ | G06N 3/08 |
| 2018/0157989 A1* | 6/2018 | Green | .................... | G06N 20/00 |
| 2019/0034497 A1* | 1/2019 | Song | .................. | G06F 16/2477 |
| 2019/0080225 A1* | 3/2019 | Agarwal | ................ | G06F 16/35 |
| 2019/0108457 A1* | 4/2019 | Jafarpour | ............... | G06N 20/00 |
| 2019/0114528 A1* | 4/2019 | Xiong | ...................... | G06N 3/04 |
| 2019/0147231 A1* | 5/2019 | Kim | ...................... | G06N 3/0445 382/181 |
| 2019/0155914 A1* | 5/2019 | Xiao | ..................... | G06Q 50/01 |
| 2019/0188561 A1* | 6/2019 | Tang | ................... | G06F 16/9535 |
| 2019/0319899 A1* | 10/2019 | Dos Santos Marujo | .................... | H04L 51/04 |
| 2020/0134058 A1* | 4/2020 | Liu | ....................... | G06F 16/285 |

OTHER PUBLICATIONS

Donkers, Tim, "Sequential User-based Recurrent Neural Network Recommendations", Proc. of the 11th ACM Conference on Recommender Systems, (2017), 9 pgs.

Rendle, Steffen, "BPR: Bayesian Personalized Ranking from Implicit Feedback", Proc. of the 25th Conference on Uncertainty in Artificial Intelligence, AUAI Press, (2009), 10 pgs.

* cited by examiner

JOINT EMBEDDING CONTENT NEURAL NETWORKS

PRIORITY

This application claims the benefit of priority to U.S. Provisional Patent Application Ser. No. 62/663,103, filed on Apr. 26, 2018, the benefit of priority of each of which is claimed hereby, and each of which is incorporated by reference herein in its entirety.

TECHNICAL FIELD

The present disclosure generally relates to special-purpose machines that manage machine learning processing and improvements to such variants, and to the technologies by which such special-purpose machines become improved compared to other special-purpose machines for content identification.

BACKGROUND

A user can use a user device (e.g., client device, mobile phone) to browse content (e.g., images, video, articles) on websites or through mobile applications. Some conventional approaches send a user's click and bookmarked content to network platforms for analysis and to recommend further content to the user. However, some users may prefer that user interaction data be anonymized or stored locally on the client side. While storing data on the client side may be preferable to some users, content recommendation may be hampered without transmitting data to network connected recommendation systems for additional content. Further, some client devices lack the processing power and sophistication to perform interaction analysis and recommend content that is likely to be of interest or useful to a given user locally on the device.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1:
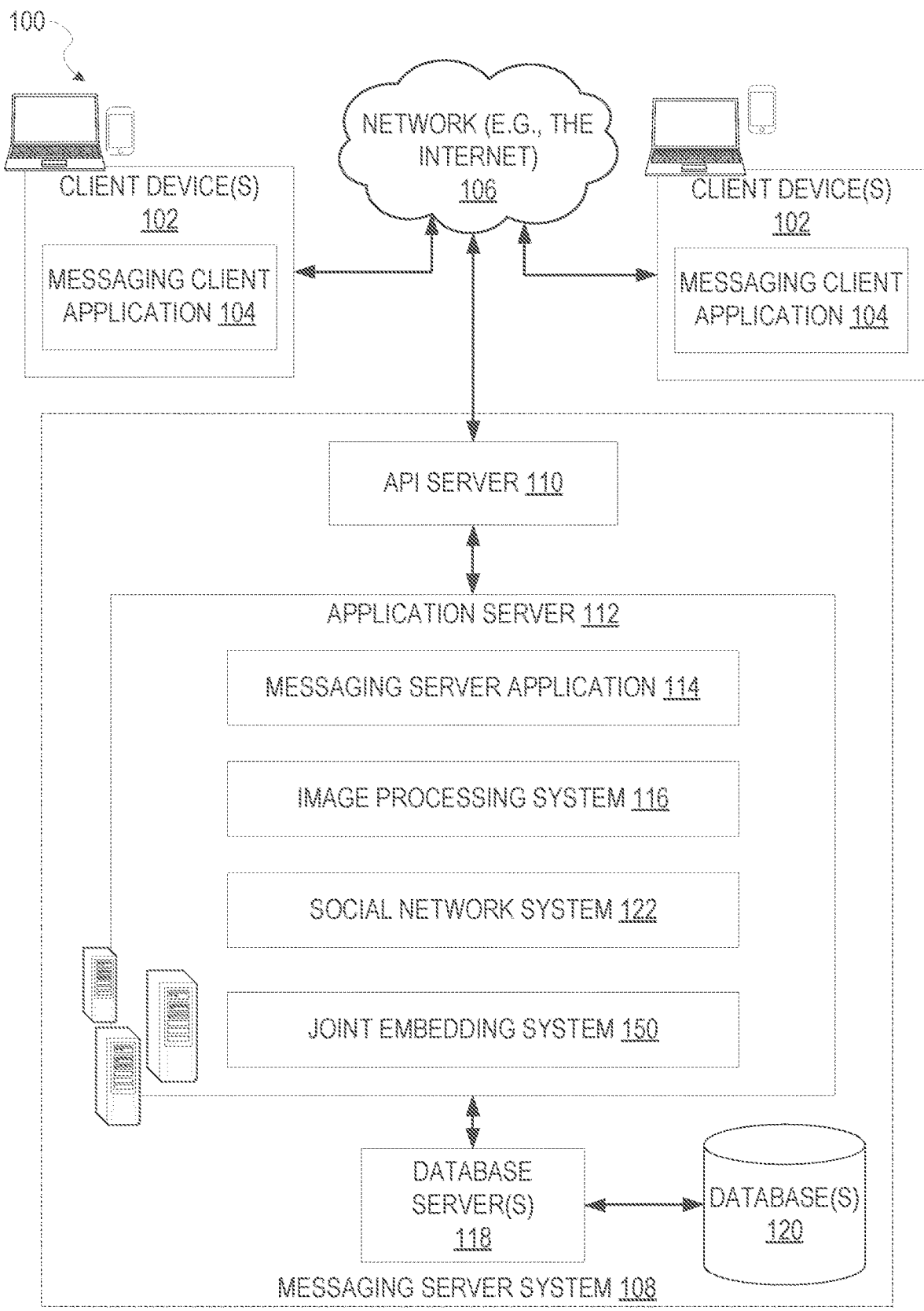
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, content recommendation can be difficult to perform on the client device side. To this end, a joint content system can be implemented to efficiently analyze user interactions and recommend content on the user's device, without needing to connect to a server platform for user embedding support; and, according to some embodiments, without needing to connect to the server platform to identify the most relevant or useful content for a given user. The following discussion is separated into three parts based on the three components of the joint content system.

(1) Real-time on-device embedding updates in constant time: In some conventional approaches, updating user data in a machine-learning-based recommender system requires retraining of the machine learning model or requires a complete reconstruction of the user representation from all available data about the user. The first of these is prohibitive for applications where the user data (and the associated recommendations) are to be updated in real-time as the user selects objects (e.g., clicks on items). The second is problematic because it causes the performance of user updates to decrease over time as more data about the user is accumulated, and further because reconstruction can additionally require that user history be continuously stored so long as the system is to operate, which may not be ideal for storage cost or privacy preferences. The joint embedding system avoids these issues by enabling a user embedding and interaction history on the user's mobile device without server support based on recursive state data as further discussed below.

(2) Bipartite triplet embeddings to preserve relative distances: Conventional triplet-embedding based recommender schemes are trained to preserve ordinal relationships, but do not have a mechanism for preserving distances between different classes of information (e.g., user data and content item data). The lack of distance preservation can be an issue for creating a joint user-item (e.g., data item) embedding mechanism that captures relationships between users and items that are defined in terms of numerical scalar values (as opposed to simple ordinal or binary relationships). To this end, the joint content system is configured to derive real-valued engagement scores that capture the degree to which a user engages with a particular data item (e.g., article, social network site story, image, video, another user's profile, etc.). The real-valued engagement scores of the joint content system are an improvement over conventional approaches that do not include a mechanism for embedding these values without treating the values as binary scores and throwing away much of the useful information.

(3) Privacy-preserving user representations for embedding-based recommender systems: Conventional recommender approaches require the storage of user-specific representations attached to an identifier for that user. For machine learning algorithms that require server-side training, a user identifier has to be passed to the server alongside the user's data. Though some approaches attempt to anonymize the identifier, anonymization in those approaches needs to be done in a reversible manner that permits the recovery of the original user identifier to allow the trained model to perform recommendations for the given user. Some conventional approaches may handle the requirement of reversibility by storing some of a given user's information on the server-side in a manner that can potentially be identified. This may not be desired by users from based on their data privacy preferences, because if the server is breached (e.g., hacked) the user's data may be exposed to malicious entities. The joint embedding system can avoid these issues by using the joint embedding space that enables a user embedding to be updated on the user's client device side, and request content from the server in a secure fashion via the user embedding, as the user embedding is a complex and dynamic feature space representation in it dimensions of the joint embedding space that obfuscates the user's identity.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and a server-side joint embedding system 150. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user. The application server 112 is communicatively coupled to a database server 118, which facilitates access to a database 120 in which is stored data associated with messages processed by the messaging server application 114.

The joint embedding system 150 is an instance of the joint embedding executed on the server-side from application server 112. In some example embodiments, the server-side joint embedding system 150 performs tasks such as joint model training, nearest neighbor analysis, and content responses (e.g., in response to content requests from the message client application 104).

Figure 2:
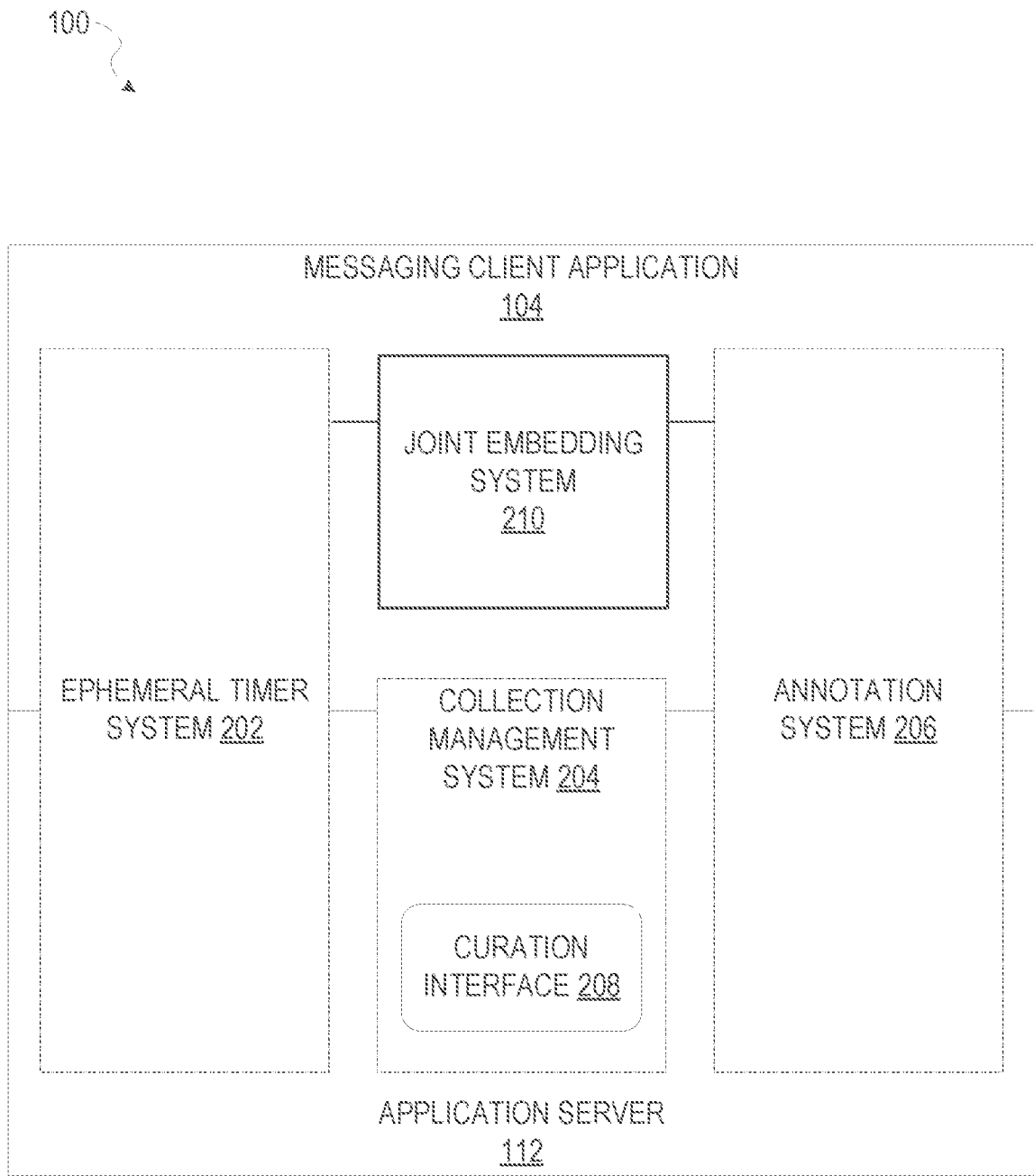
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a client-side joint embedding system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

As discussed in further detail below, client-side joint embedding system is configured generate and update a user embedding, and identify content (e.g., locally or via server) using the user embeddings, as discussed in further detail below.

Figure 3:
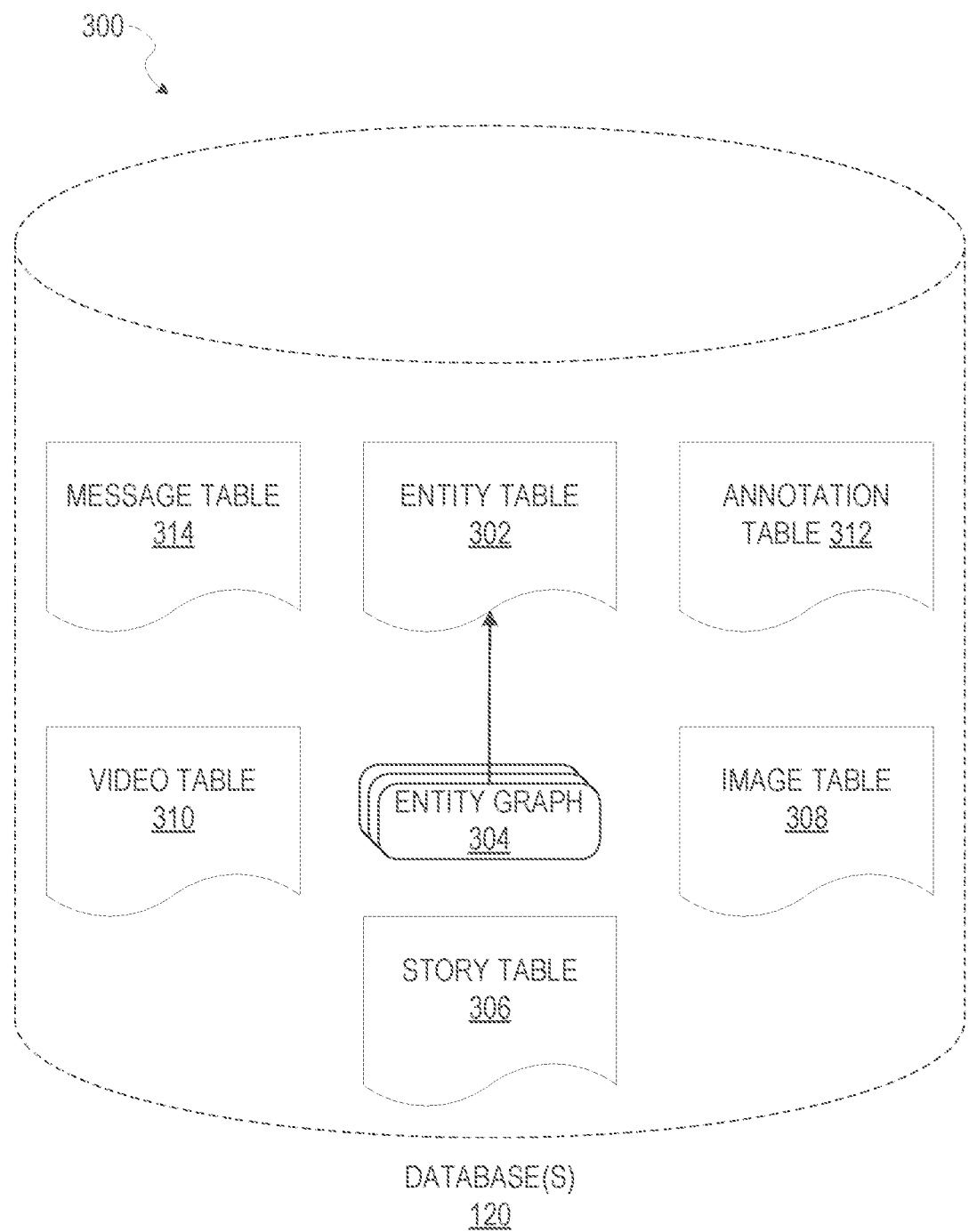
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
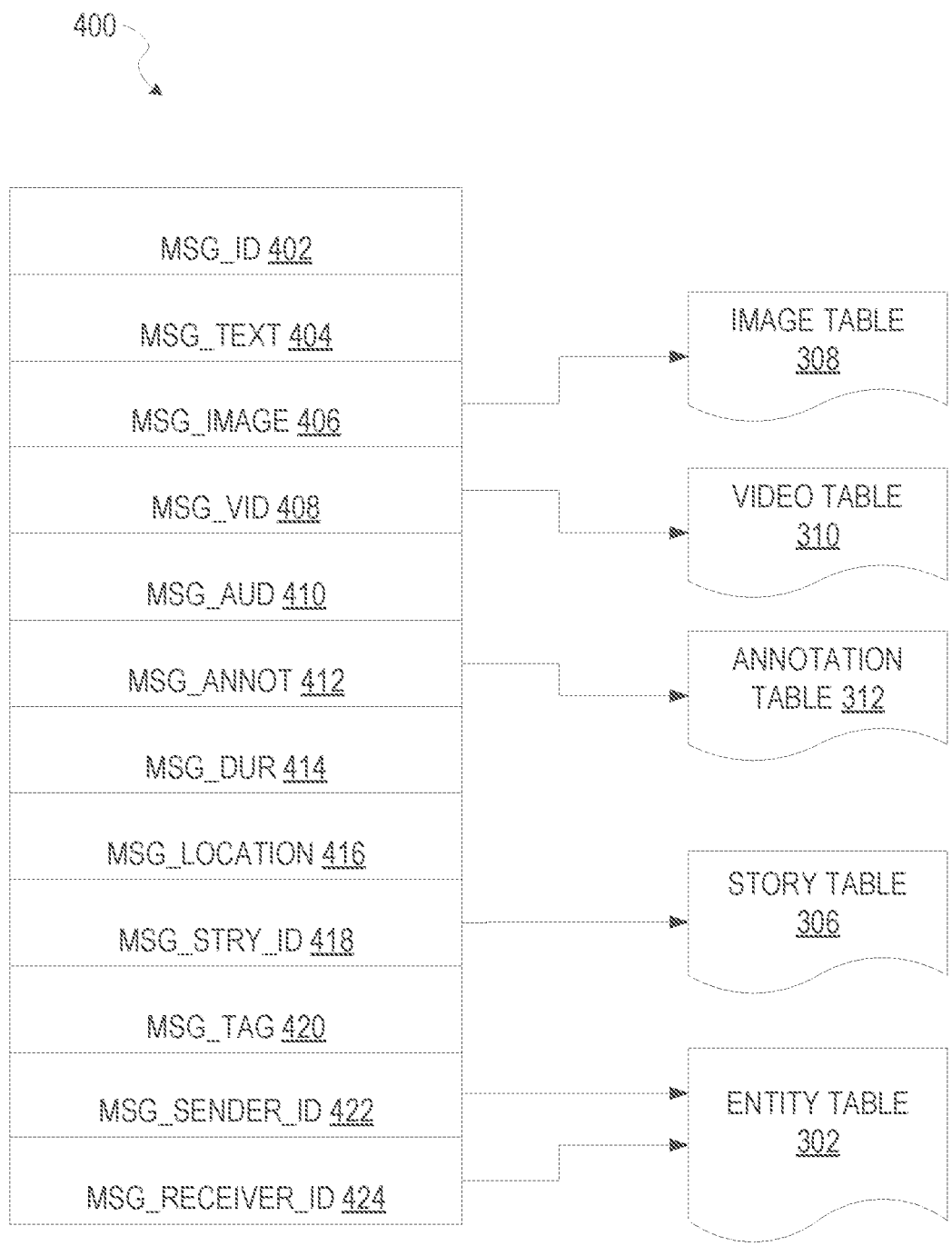
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
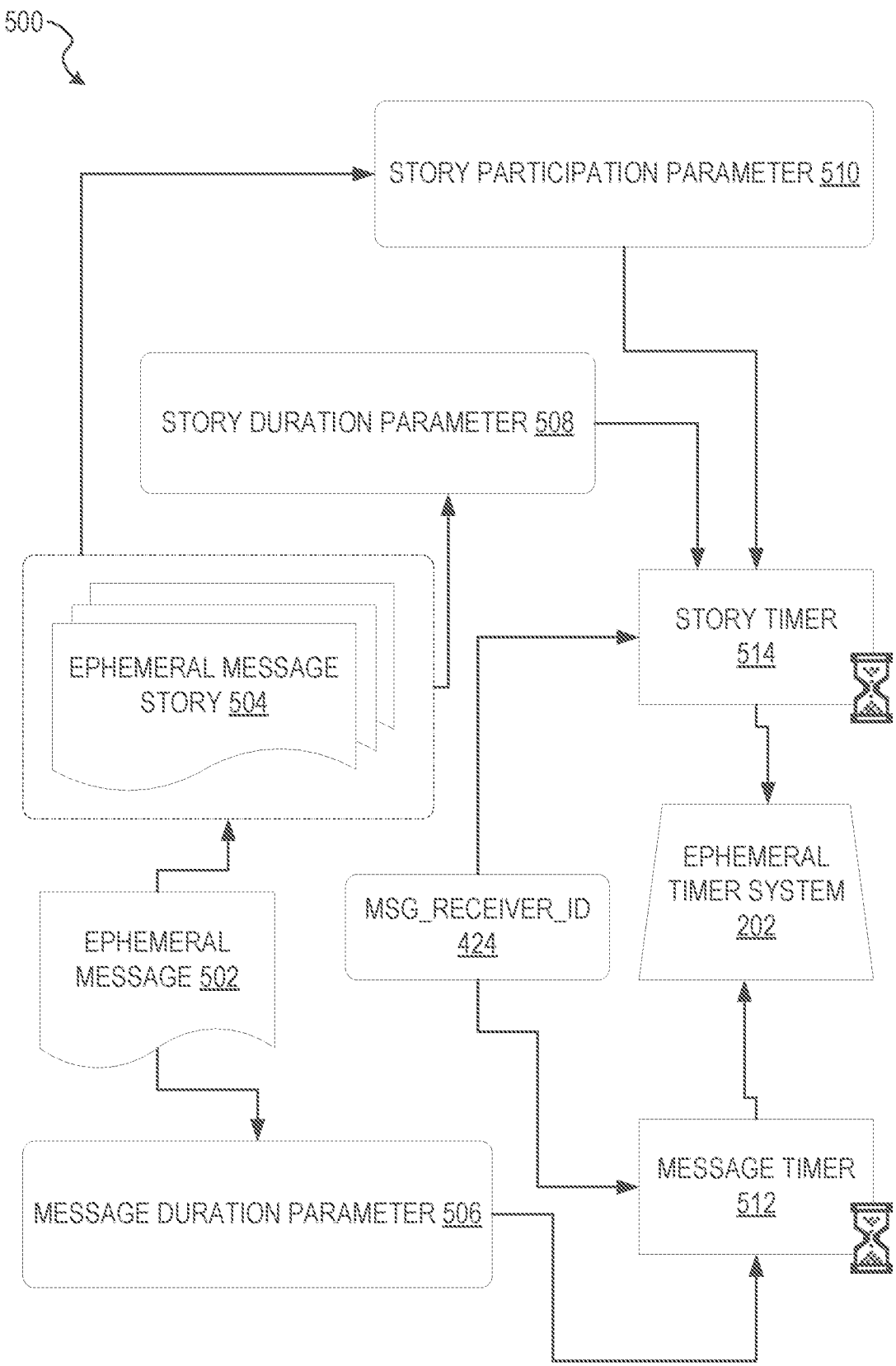
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6:
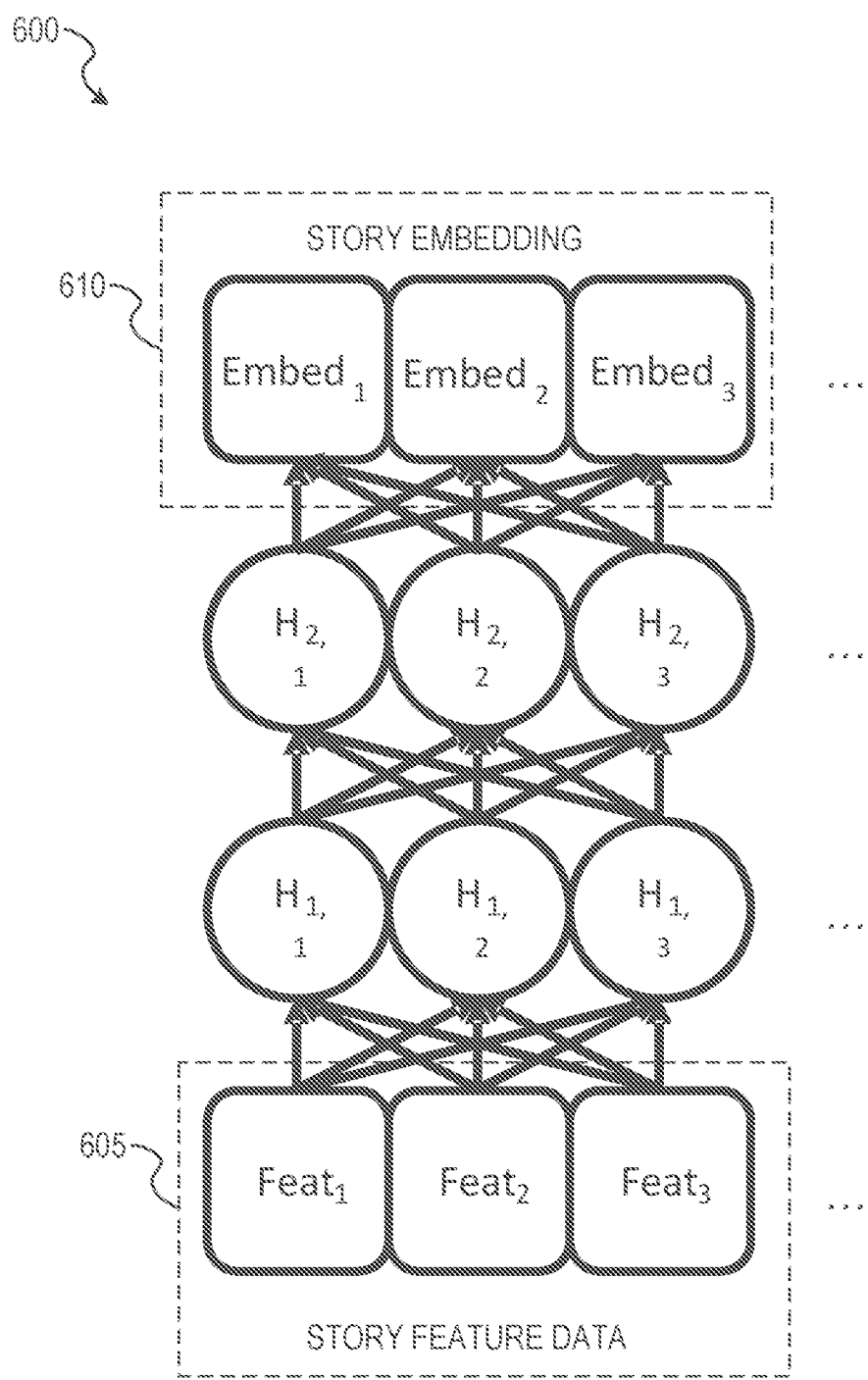
FIG. 6 shows an item embedding network, according to some example embodiments.
Figure 7:
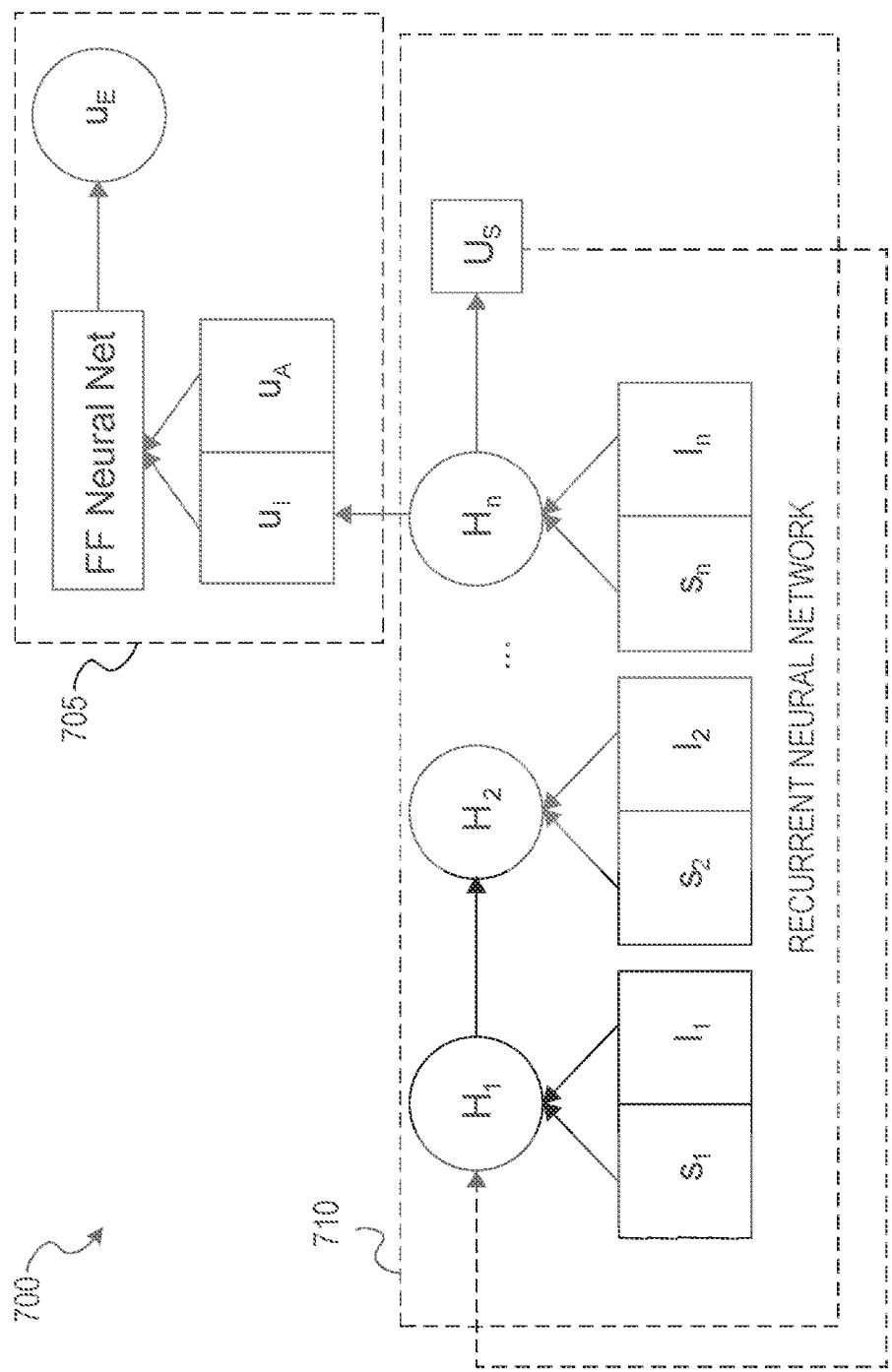
FIG. 7 shows a user embedding network, according to some example embodiments.
Figure 8:
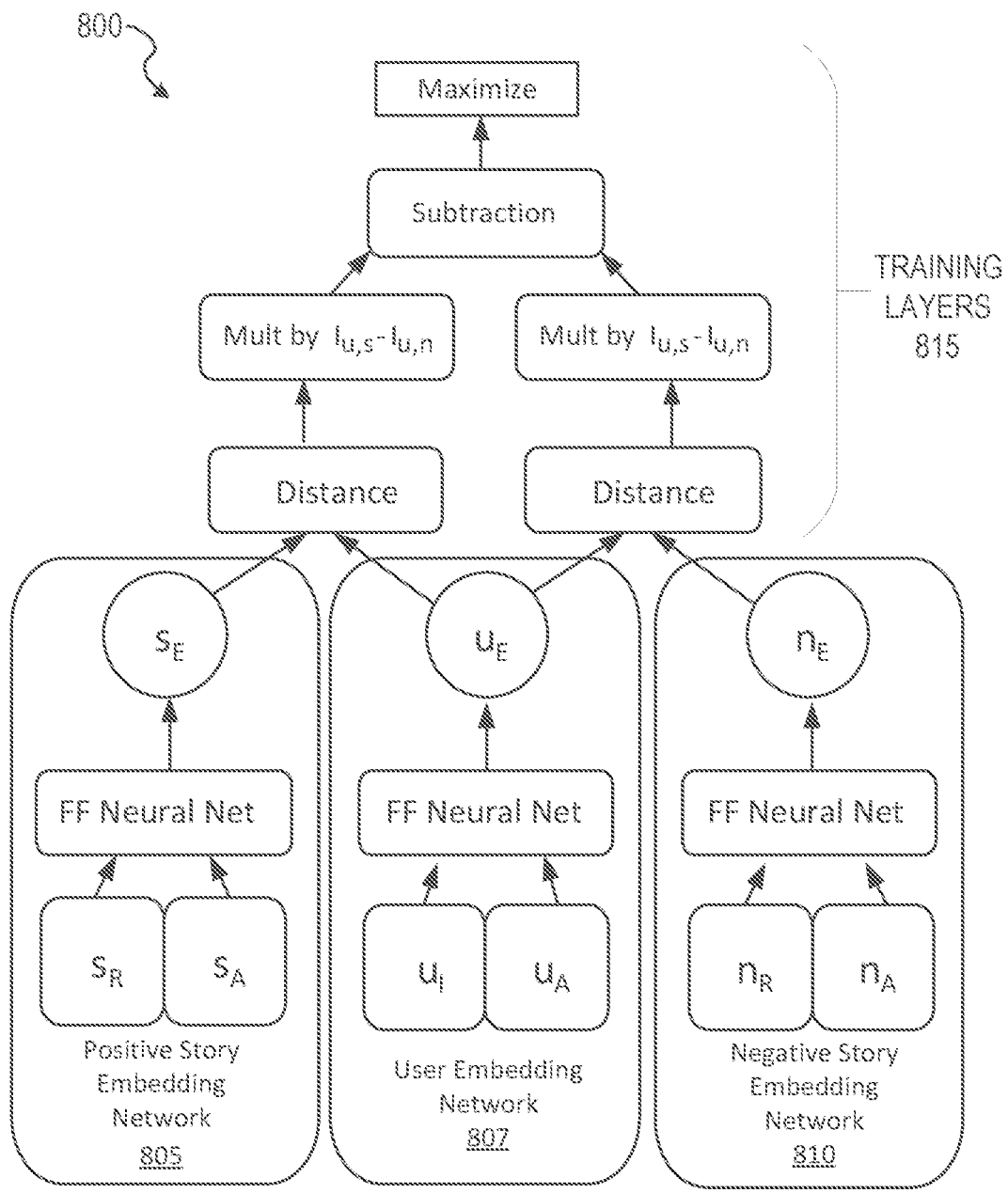
FIG. 8 shows a joint embedding training architecture, according to some example embodiments.
Figure 9:
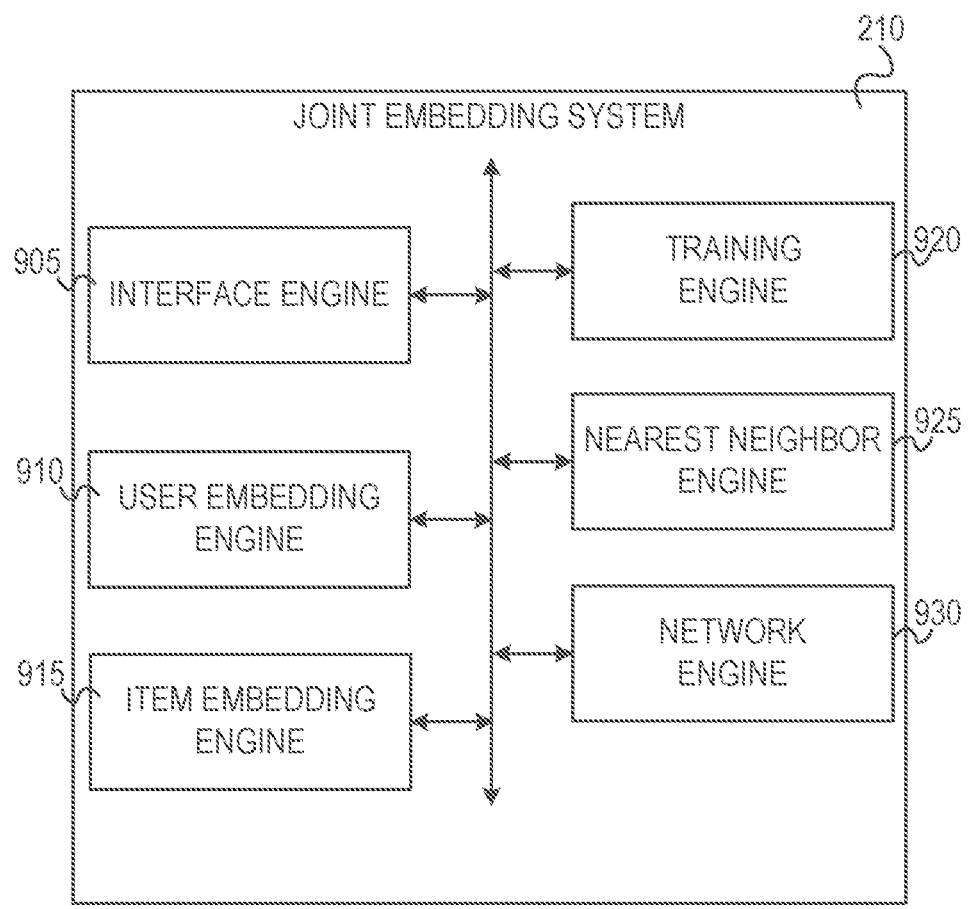
FIG. 9 shows example internal functional engines of a joint embedding system, according to some example embodiments.
Figure 10:
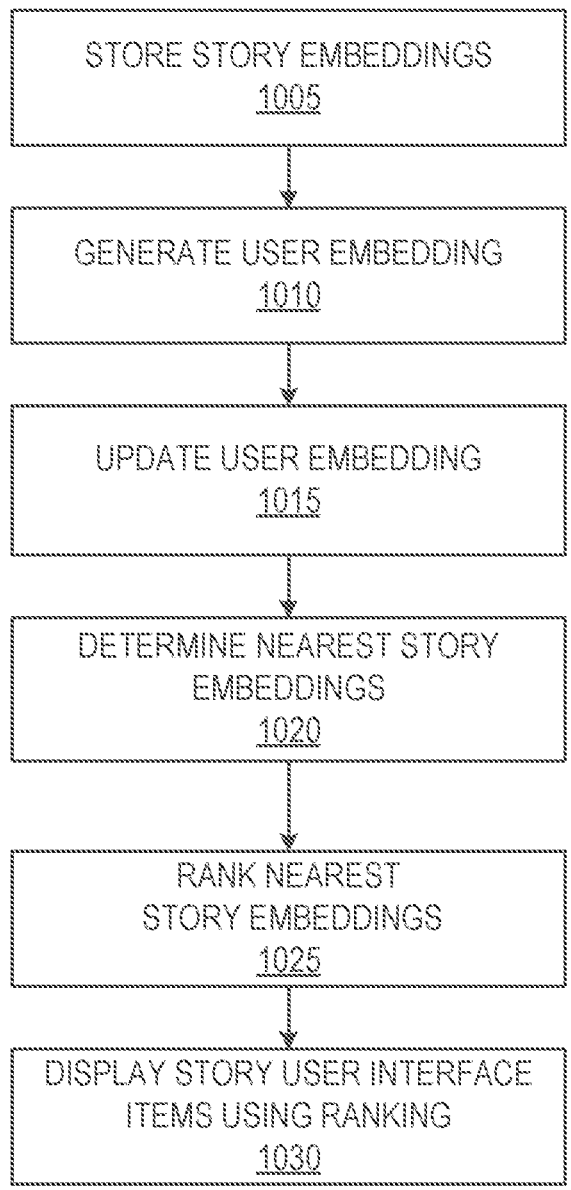
FIG. 10 shows a flow diagram for a method for recommending content using a joint embedding, according to some example embodiments.

A detailed description of the joint embedding system is included here, followed by an example using user data and story data with reference to FIGS. 6-8, followed by example joint embedding methods in FIGS. 9 and 10, and example user interfaces in FIGS. 12A-12D.

The joint embedding system is designed to embed users and items in the same space (e.g., embedding space, feature space) in a manner that respects relative distance relations defined between users and items (e.g., content items, images, articles, videos, friend posts, etc.). This allows recommendations to be generated by finding the nearest item neighbors to a given user (e.g., nearest neighbor to that user's embedding in the shared embedding space). According to some example embodiments, the embeddings are generated by two separate networks: an item embedding network for embedding items of content, and a user embedding network for embedding users.

The item embedding network is a learned mapping between an item property vector (e.g., a vector from item properties or attributes, such as title, view count, length) and an embedding vector generated from the item (e.g., an embedding vector generated by a fully connected neural network). The user embedding network is a learned mapping between a user attribute vector (e.g., a vector from user properties, such as gender, age, location, user interests) and a sequence of user-item interaction vectors from user interactions with content generated by a neural network (e.g., a recurrent neural network). The user embedding network is configured in a manner that enables efficient updating of the user embedding and the subsequent recommendations without contacting the server. The user embedding network is also constructed so as to enable the preservation of user privacy because the complex dynamic user embedding obfuscates the user's identity. According to some example embodiments, training is performed using triplet loss and a dual neural network (e.g., a Siamese neural network) that preserves relative numerical distances between the user embeddings and item embeddings.

The user embedding network is configured to update user representations in real-time without storing the user's full interaction history. This is enabled via utilizing a neural network to create a content-based representation of each user where there is no distinct representation learned for each particular user. This approach is in contrast to conventional collaborative-filtering based approaches that learn representations for each user based on sophisticated global inference of representations.

In the user embedding network, the user is represented using a combination of the user's attributes (such as their gender, their age group, their country code, etc.) and the user's history of interaction with the system (e.g., content provided by messaging client application 104). The user's interaction history is captured as the items the user clicked on, the properties of these items (headline, publisher description, etc.) and the properties of the user-item interactions (how long they viewed the item, what time they viewed the item, where the item appeared in the user's item feed in messaging client application 104, etc.) The fact that the user is represented in terms of content instead of an identifier means that the joint model can learn to generate a user embedding based on the known properties of a user instead of relying on learning a unique representation for each user. This allows new users to be added to the joint embedding system without retraining the model, and further allows users' embeddings to be updated by updating the content used to generate respective user representations.

The user embedding is also generated using a more semi-static representation of the user: a user vector generated using user attribute or profile data (e.g., age, gender, likes, country, etc.). Since a user's attributes are represented by the fixed length vector, updating these attributes takes only constant time.

In contrast, the user interaction history has an indefinite length, and cannot prima facie be updated without memorizing this history and recomputing the user representation by going through the history. This takes linear time in the length of the history and therefore gets slower as more history is acquired. However, to this end, the recurrent neural network manages the indefinite length history as follows.

In some example embodiments, the user embedding network implements a recurrent neural network (e.g., a long short-term memory (LSTM) network) to represent the user interaction history, which conventionally requires the recomputation of the user interaction history to update. In some example embodiments, the user embedding network only stores the final hidden state (e.g., recurrent state data of a previous sum of interactions) of the recurrent neural network on the user's device. In this way, updating the user embedding only requires a state update to the hidden state and additional and the new interaction information. Since the size of this state representation is independent of the length of the user interaction history, this representational scheme allows the user embedding network to update the user embedding representation on the device using an amount of computation independent of the user interaction history and does not require that the joint embedding system store the user interaction history on the device, according to some example embodiments.

As mentioned, the user data and the content data can be embedded in a joint embedding space that allows for relevant or useful content to be found by determining the nearest item embeddings to the current user embedding in the shared space. In some example embodiments, a joint embedding architecture is implemented using bipartite triplet embeddings to preserve relative distances between the different classes of information (users, content). In some example embodiments, the joint embedding architecture implements an objective function that smoothly captures the desired properties out of which the desired embedding will emerge when trained on a dataset using a triplet loss and gradient descent optimization.

The embeddings are obtained by training a neural network to generate user and item embeddings (to learn a function from raw user properties to a user vector and a function from raw item properties to an item vector) that satisfy this objective function. This function is derived as follows using the following notation:

U: An example user that to be embedded.
$I_1$: An example item to be embedded (for which there is a distance defined between $I_1$ and U)
$I_2$: Another example item to be embedded (for which there is a distance defined between $I_2$ and U)
$D_1$: Ground truth distance from $I_1$ to U
$D_2$: Ground truth distance from $I_2$ to U
$E_{11}$: $I_1$ embedding
$E_{12}$: $I_2$ embedding
$E_U$: User embedding
$S(E_1,E_2)$: Distance function between two embeddings (for example, the Euclidean distance)

The objective function is as followed, according to some example embodiments:

$$\operatorname{argmin}(\log(\operatorname{sigmoid}((D_1-D_2)*S(E_{11},E_U)-(D_1-D_2)*S(E_{12},E_U))))$$

The above objective function is based on a reification of the modeling objective that users should be closer to items that they are more likely to enjoy:

IF $D_1 > D_2$:
  THEN minimize $(S(E_{12}, E_U)-S(E_{11}, E_U))$
ELIF $D_1 < D_2$:
  THEN minimize $(S(E_{11}, E_U)-S(E_{12}, E_U))$
ELSE $(D_1 = D_2)$:
  THEN don't do anything The above encapsulates the following: the distance between a user and an item that the user enjoys more should be smaller than this distance between that user and an item that they enjoy less. Further, by noticing the continuity of the relationship, additional smoothness properties can be included; in particular:

$$D_1-D_2 \propto S(E_{11},E_U)-S(E_{12},E_U)$$

error=$(S(E_{11},E_U)-S(E_{12},E_U))-c(D_1-D_2)$ (where $c$ is a constant)

This formulation captures the notion that the degree to which the model is wrong (e.g., the error) is proportional both to the differences of predicted distances between the two items and the user and the difference between the ideal distances between the two items and the user. Increasing the ideal distance (e.g., a higher true gap between user-item preferences) increases the error and increasing the predicted distance also increases the error.

However, the above does not take the form of a triplet objective, which needs to be expressed in terms of a specific quantity to be minimized locally (the constant makes this difficult, since it is a global parameter that is not known). To this end, this expression: $\text{argmin}((D_1-D_2)(S(E_{11}, E_U)-S(E_{12}, E_U)))$, is modified to arrive at: $\text{argmin}((D_1-D_2)*S(E_{11}, E_U)-(D_1-D_2)*S(E_{12}, E_U))$, the latter of which allows computations of contributions of both item distances separately.

A ranking triplet loss is introduced by way of including a sigmoid function and a logarithm function, which yields an objective function: $\text{argmin}(\log(\text{sigmoid}((D_1-D_2)*S(E_{11}, E_U)-(D_1-D_2)*S(E_{12}, E_U))))$. This function has desirable properties, as the output of the $\log(\text{sigmoid}((D_1-D_2)*S(E_{11}, E_U)-(D_1-D_2)*S(E_{12}, E_U)))$ component is proportional to the ordinal probability that a user prefers item 1 to item 2, weighted by the degree to which the user prefers item 1 to item 2. If it is additionally assumed that the observed preference degrees are sampled from a normal distribution centered around the true preference degrees, then the above reduces to the numerical probability that a user prefers item 1 to item 2, weighted by the degree to which the user prefers item 1 to item 2, as informed by additional information about the degree of the preference. If the function is optimized using a gradient method (e.g., stochastic gradient descent), then the resultant gradients are proportional in magnitude to the differences in user-item preferences, inducing greater pressure for the algorithm to produce the relative ranking correct between items with a large difference in preference for a given user than for those with a smaller difference in preference. The gradient pressure on various items for a given user is equivalent when the distances between the items and that user are proportional to the ground truth similarities (e.g., the user-item engagement scores). When this is applied to an entire dataset, the result is for items to lie near users for which they are likely to have high engagement and far from users that are likely to have low engagement. Furthermore, users with similar preferences lie near each other and items that elicit similar user behaviors should lie near each other.

As mentioned, the user embedding network further preserves user data privacy. In particular, because the embedding network represents users by their interaction history (e.g., in a user embedding) instead of by a unique identifier or a unique stored representation, identification of the user is impractical. The anonymity aspect of the user embedding is enabled via the system providing recommendations based on raw user attributes and interaction history, and does not require the learning of individual user-specific representations that would need to be maintained on the server and transmitted back to their respective users (which would require maintaining a reversible identifier for that user attached to the user's attribute and interaction information on the server).

In some example embodiments, to prevent server-side identification of user data, the data is separated into three components based on where the data is stored and transmitted. The components are the user's device, the server, and the transmissions (e.g., content requests).

In some example embodiments, the server contains information about interaction history of platform users, but without any reversible user identifiers attached. Using this representation, the server cannot identify specific users, as it contains no information linking any of the statistical data to users' themselves (not even encrypted information). In some example embodiments, the device stores a user's interaction history as well as the user's personal information, but does not contain any information about other users. In some example embodiments, the transmissions may contain user attribute and interaction history information without any reversible identifier information, or may separately contain user embeddings or item content. In this way, user's client devices send attribute and interaction data to the server in a completely anonymized manner (e.g., via embedding) without including any information that would allow the server to identify the user to which the data belonged. This anonymous data transmission is akin to locking the door and throwing away the key that would enable the server to map the data back to a specific user.

In some example embodiments, the joint embedding architecture of the system is trained server-side by learning to directly embed user interaction histories and item properties into a shared space that preserves relative co-locality of users and items with high affinity. The result of the training is a pair of functions: one for mapping a set of item properties to an item embedding and another for mapping a set of user properties and interaction history to a user embedding. These functions (e.g., the trained user embedding network, the trained item/content embedding network) are transmitted from the server to the device, and further can be maintained on both the server and the device, according to some example embodiments. In some example embodiments, the content embedding network is only transferred to the user client device in those implementations where the user device is to perform generation of an item embedding for real-time, on-device ranking and re-ranking of content items.

Given these learned functions, recommendations for content can be generated by embedding a user's interaction history on the device (either using a saved representation of the full interaction history or using a condensed representation) and sending this embedding to the server as a query to retrieve recommended items based on an approximate nearest-neighbor retrieval scheme. Though this embedding may be sent to the server in a reversibly identifiable manner (e.g., as a request from an identifiable client device), the user data does not in itself contain interpretable information about the user as it is a dynamic embedding (e.g., changing per interactions, per content, per user attribute/profile vector changes) and therefore user privacy is preserved.

In some example embodiments, content recommendations can also be obtained by embedding items and the user on device and computing the nearest neighbor function (e.g., Euclidean distance, inner product, k nearest neighbors) without communicating with the server. Further, since the server contains no information that would allow the association of user attribute and interaction information with a particular user—even if decrypted—network sites that implement joint embedding system (e.g., messaging server system 108 and application server 112) can maintain a higher level of user privacy than conventional approaches.

FIG. 6 shows an item embedding network 600, according to some example embodiments. In the example illustrated, the item embedding network is a fully connected neural network that receives content data (e.g., story data) as input data 605, and generates (via hidden layers, "$H_{1,1}, H_{1,2}, H_{1,3}$ ...") the output data 610, which in the illustrated example is the story embedding that can be used for nearest neighbor determinations. As discussed here, a story is a multi-part electronic document having multiple pages, where each page can correspond to a full screen image, video or article portion. Although story and story embeddings are discussed here as an example, it is appreciated that the content items can be other items such as audio files, website webpages, user posts of a HTML website, streaming content files identified by network addresses (e.g., URL), and so on.

Example features (e.g., "$Feat_1$ ...") of a content item can include, for example, story edition headline data (a topic mixture vector), a publisher description data (a topic mixture vector), number of ephemeral messages in the edition (numeric), edition tap or interaction count (numeric), edition impression count or display count (numeric) for a story, and so on. The output data 610 is an item embedding with n dimensions. After the joint embedding model is trained (discussed below with reference to FIG. 8), the item embedding network 600 can readily generate new content embeddings by inputting new input data into the item embedding network 600 and storing the output data (e.g., the new content item embedding).

FIG. 7 shows a user embedding network 700, according to some example embodiments. The user embedding network 700 is a learned mapping between a user attribute vector and a sequence of user-item interaction vectors. The user embedding network 700 is configured to enable efficient updating of the user representation and the subsequent recommendations without contacting the server. The elements use the following notations:

$S_i$—Story representation interacted with at step i
$I_i$—Interaction type at observation i
$H_i$—RNN hidden state at observation i
$U_S$—User LSTM hidden state output
$U_I$—Total user interaction representation for user u
$U_A$—User attribute representation (vector)
$U_E$—User embedding (used to find nearest neighbors)

Examples of user attribute embeddings ("$U_A$") include: country code (one-hot); region (one-hot); gender (one-hot); age group (one-hot); friend count (numeric); account age (numeric); user interests (vector of different interest category scores)

Examples of user interaction embeddings ("$U_I$") include: all individual item features; date (numeric); position shown in story/item feed (one-hot); whether user clicked (one-hot); story/post view ratio (numeric); channel engagement score (numeric); whether partial view (one-hot); seconds since last tap (numeric); featured tap count (numeric); channel tap count (numeric); channel unique tap count (numeric); cell view count (numeric); unique cell view count (numeric); edition age (numeric); minute of day (numeric); day of week (one-hot); is subscribed (one-hot), and so on.

As illustrated, according to some example embodiments, the user embedding network comprises a recurrent neural network 710 (RNN) that generates a hidden user interaction state ($U_S$) for later updates to the user embedding, and the current user interaction embedding for n-interactions of user history. The user embedding network 700 further comprises a fully connected (feed forward (FF)) neural network that generates the user embedding, $U_E$, from the user interaction embedding $U_I$ and the user attribute or profile vector $U_A$.

Further, although content and users are discussed here for the joint embedding space as an example, it is appreciated that the joint embeddings space can be configured for two different classes of data other than users and user interface content items. For example, audio data could be embedded via the item embedding network 600 by using features that describe the given audio file as input data. Further, user interaction data could be play count, duration of play, and so on. It is further appreciated that the user embeddings need not data of users, but rather data that is continuously updated. For example, instead of user embeddings, an automobile embedding can be continually updated via the recurrent neural network to capture the current state of a given automobiles performance, and the item embeddings, continuing the example, are new parts that are installed in the automobile, where some parts perform better with a given vehicle than others. For example, platinum spark plugs would correspond to a story item embedding, and performance in different cars (which correspond to users) can be tracked by putting the car embeddings in the parts embedding space, such that parts can be recommended via nearest neighbor distance metrics as discussed above.

FIG. 8 shows a joint embedding training architecture 800, according to some example embodiments. The joint content training architecture 800 is configured to embed users and items in the same space in a manner that respects relative distance relations defined between users and items, according to some example embodiments. This approach enables new content to be selected and recommended to a user by determining the nearest item neighbors to a given user embedding. The elements are denoted as follows:

$I_{u,s}$—Interaction score between user u∈U and story s∈S
$U_I$—User interaction representation (RNN output)
$U_A$—User attribute representation
$S_R$—Positive story raw representation embedding (e.g., generated by item embedding network 600)
$S_A$—Positive story attributes (e.g., attribute vector from features/attributes of positive story)
$N_R$—Negative story raw representation embedding (e.g., generated by item embedding network 600)
$N_A$—Negative story attributes (e.g., attribute vector from features/attributes of negative story)
$U_E$—User embedding
$S_E$—Story embedding $N_E$—Negative story embedding In the example joint training architecture 800, two item embedding networks are implemented for training: a positive story embedding network 805, and a negative story embedding network 810. The positive and negative story embedding networks are used in training to train the user embedding network 800 (e.g., the weights in network 807) so that the user embedding is in the space shared space as the story space as discussed above. Further, the recursive neural network portion not depicted in FIG. 8 to clarify the overall layout of the training architecture. Further, as illustrated in FIG. 8, the story embedding networks may be differently configured during training and at runtime. For example, positive story embedding network 805 and negative story embedding network 810 receive story attributes and raw embeddings as inputs, whereas the runtime item embeddings network 600 in FIG. 6 generates a story embedding and relies on the user embedding being in the joint space, thereby directly comparable to the story embedding. network The term "negative" in FIG. 8 is used as an example story that has a negative interaction, e.g., the user was presented with the story but did not interact (e.g., click, read) with the story, as opposed to a "positive" story in which the user positively interacted with the data by reading to completion, viewing it for a long duration of time, bookmarking or saving it, and so on. In some example embodiments, the story data used for training is pre-partitioned into positive and negatives sets, and two story items (one negative for negative story embedding network 810 and one positive for positive story embedding network 805) are used per training iteration to train the model. During training, respective embeddings (e.g., positive story embedding $S_E$, user embedding $U_E$, and negative story embedding $N_E$) are input into the training layers 815 for application of the training Siamese distance based objective function (via gradient descent) as discussed above. In some example embodiments, the training operations for architecture 800 are configured as follows:

::::Repeat n times for all training data:::
1. Sample a user (e.g., $U_E$)
2. Sample two items from the items that user has interacted with (e.g., select a positively interacted with story and a negatively interacted story).
3. Input user and item data into model
4. Compute distances between item embeddings and the user embedding (see distance function in objective function above).
5. Weight these distances by the difference in the multiplier scores (see multiplication operations in objective function and in FIG. 8)
6. (a) Take the difference between these weighted distance (see subtraction operation in objective function and in FIG. 8), also (b): Add a sigmoid to represent class probabilities and to stabilize the numerical properties, also (c) Add a logarithm to transform to log-likelihood to further stabilize the numerical properties
7. Use the result as an error score, compute gradients, and update based on a stochastic gradient descent scheme
8. Repeat for further data items (e.g., n times) until model is refined or training data is exhausted.

After training, the user embedding network 705 is trained for the shared or joint embedding space and can generate new user embeddings as new interaction data is created. Further, after training, to create new story embeddings, the simplified item embedding of network 600 can be implemented to generate new content embeddings (e.g., the positive story embedding network 805 and negative story embedding network 810, and training layers 815 are not used after the training procedure is complete and the model is created).

FIG. 9 shows example internal functional engines of a joint embedding system 210, according to some example embodiments. In the example illustrated, the joint embedding system 210 comprises an interface engine 905, a user embedding engine 910, an item embeddings engine 915, a training engine 920, a nearest neighbor engine 925, and a network engine 930. The interface engine 905 manages receiving interactions from a user. The user embedding engine 910 manages generating a user embedding using user embedding network 700. The item embedding engine 915 manages generating item embeddings using an item embedding network 600. The training engine 920 handles training the model in the joint embedding space using the training architecture 800 in FIG. 8. The nearest neighbor engine 925 manages finding which item embedding networks are nearest neighbors to a given user's user embedding (e.g., via Euclidean distance, inner product distance in shared embedding space, k nearest neighbor neural network, or other distance mechanisms). The network engine 930 manages generating a request for content or transmitting a response to a client device. In some example embodiments, one or more engines of the joint embedding system 150 are hosted or run on the server side. For example, in some example embodiments, the training engine 920, item embedding engine 915, and nearest neighbor engine 925 are managed by the server-side joint embedding system 150 and the user embedding engine 910 manages the user data locally on the client device 102. In those embodiments, the client-side joint embedding system 210 transmits a request for content to the server side joint embeddings system 150, where the request includes the user embedding, which is anonymous as discussed above.

FIG. 10 shows a flow diagram for a method 1000 for recommending content using a joint embedding, according to some example embodiments. At operation 1005, the client-side system 210 stores the story embeddings generated by the server-side system 150 (e.g., by item embedding 915 as trained by training engine 920 on the server side). At operation 1010, the user embedding engine 910 generates a user embedding and stores the hidden state data of the user interaction history on the client device.

At operation 1015, the user embedding engine 910 updates the user embedding. For example, the interface engine 905 receives new user interactions with content on the client device, and user embedding engine 910 updates the hidden state and then generates a new updated user embedding.

At operation 1020, the nearest neighbor engine 925 determines nearest story embeddings that are nearest to the new updated user embedding. For example, the nearest neighbor engine 925 computes the inner product between the updated user embedding and the multiple available story embeddings to determine a set of nearest story embeddings (e.g., top three nearest story embeddings, etc.).

At operation 1025, the nearest embeddings are ranked in order of nearness to the updated user embedding. In some example embodiments, operation 1025 is omitted where the nearest story embeddings are automatically ranked in the nearest neighbor operation (e.g., operation 1020).

At operation 1030, the interface engine 905 displays the nearest ranked stories to the user as suggestions or potential selections for the user to browse and interact.

Figure 11:
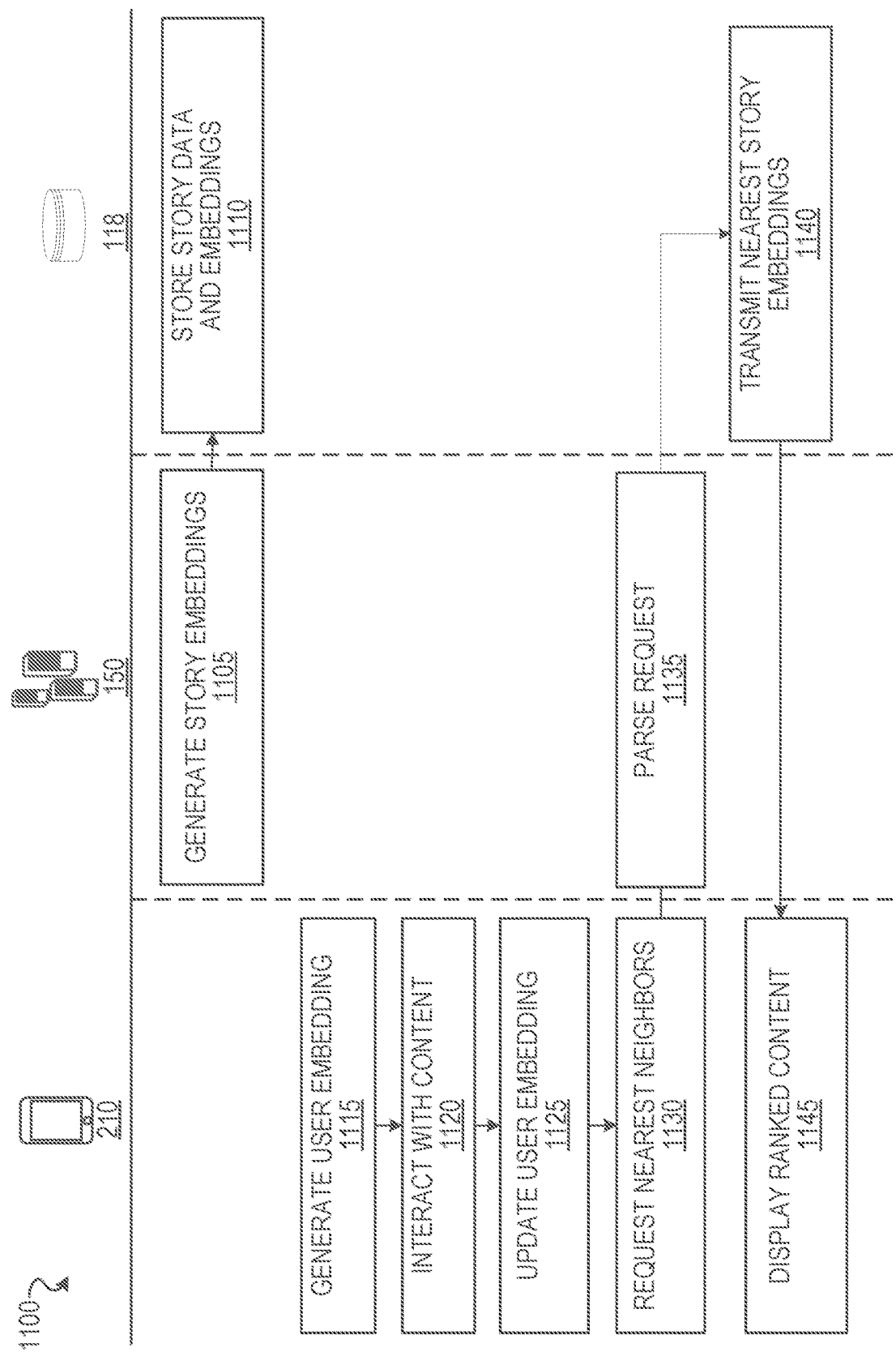
FIG. 11 shows an example network interaction diagram for anonymous content updates, according to some example embodiments.

FIG. 11 shows an example network interaction diagram 1100 for anonymous content updates, according to some example embodiments. With reference to the server-side middle lane and far right late (a database lane), at operation 1105, the server-side joint embedding system 150 generates story embeddings, and at operation 1110, the database server 118 stores the embeddings in database 120.

Concurrently, with reference to the left client-side lane, at operation 1115, the system 210 generates a user embedding. At operation 1120, a user of the client device interacts with new content. At operation 1125, the system 210 updates the user embedding per the new interactions. At operation 1130, the system 210 requests new content from the server side (e.g., from server-side joint embedding system 150).

At operation 1135, the server-side joint embedding system 150 parses the request to request the nearest neighbors (e.g., nearest story neighbors to the user embedding). At operation 1140, the database server 118 (or server-side joint embedding system 150, according to some example embodiments) sends the nearest neighbor story embeddings to the system 210. At operation 1145, the system 210 displays the content, which can optionally be ranked, to the user for selection and interaction.

Figure 12A:
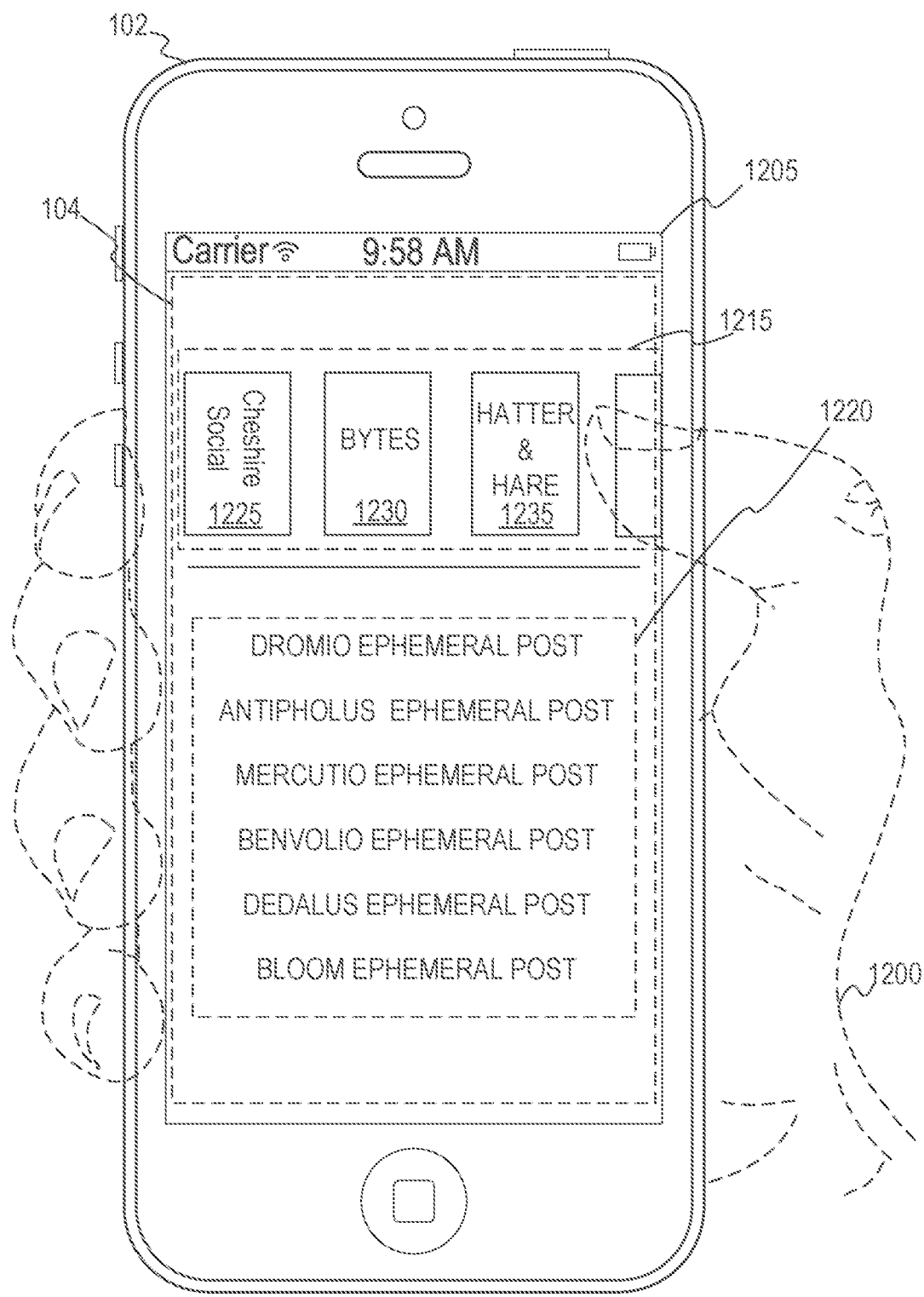
FIGS. 12A-12D show example user interfaces for a joint embedding system, according to some example embodiments.
Figure 12B:
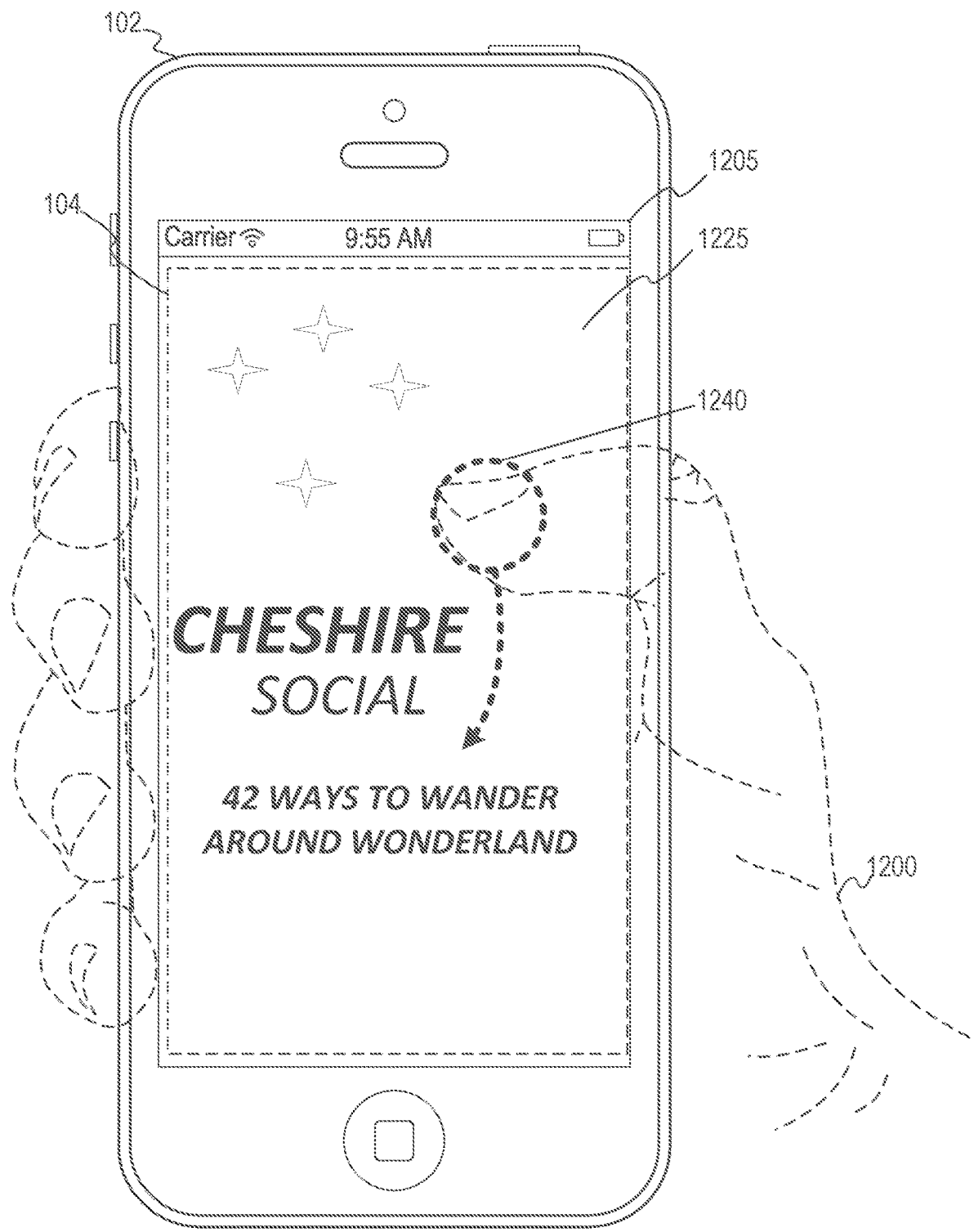
Figure 12C:
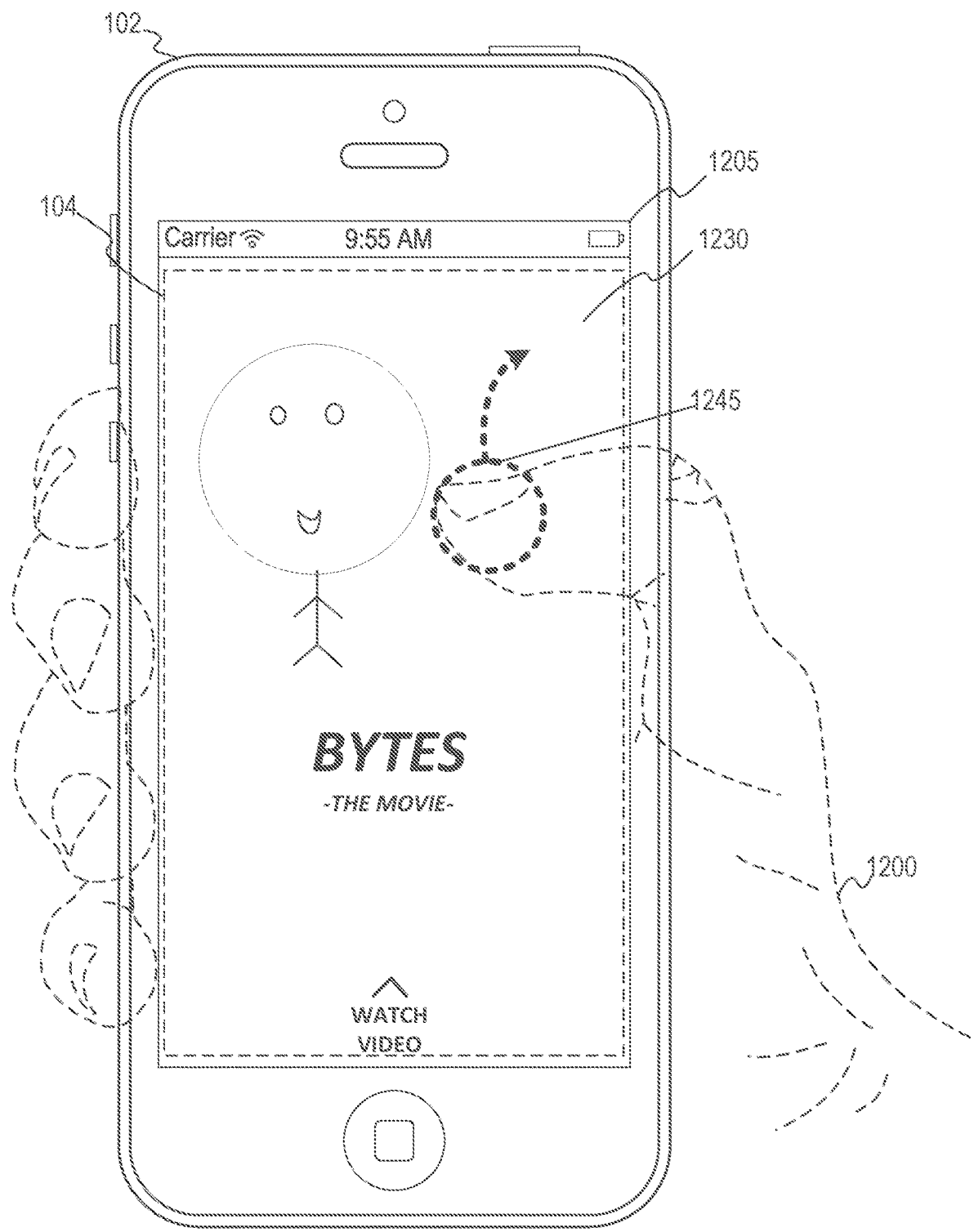
Figure 12D:
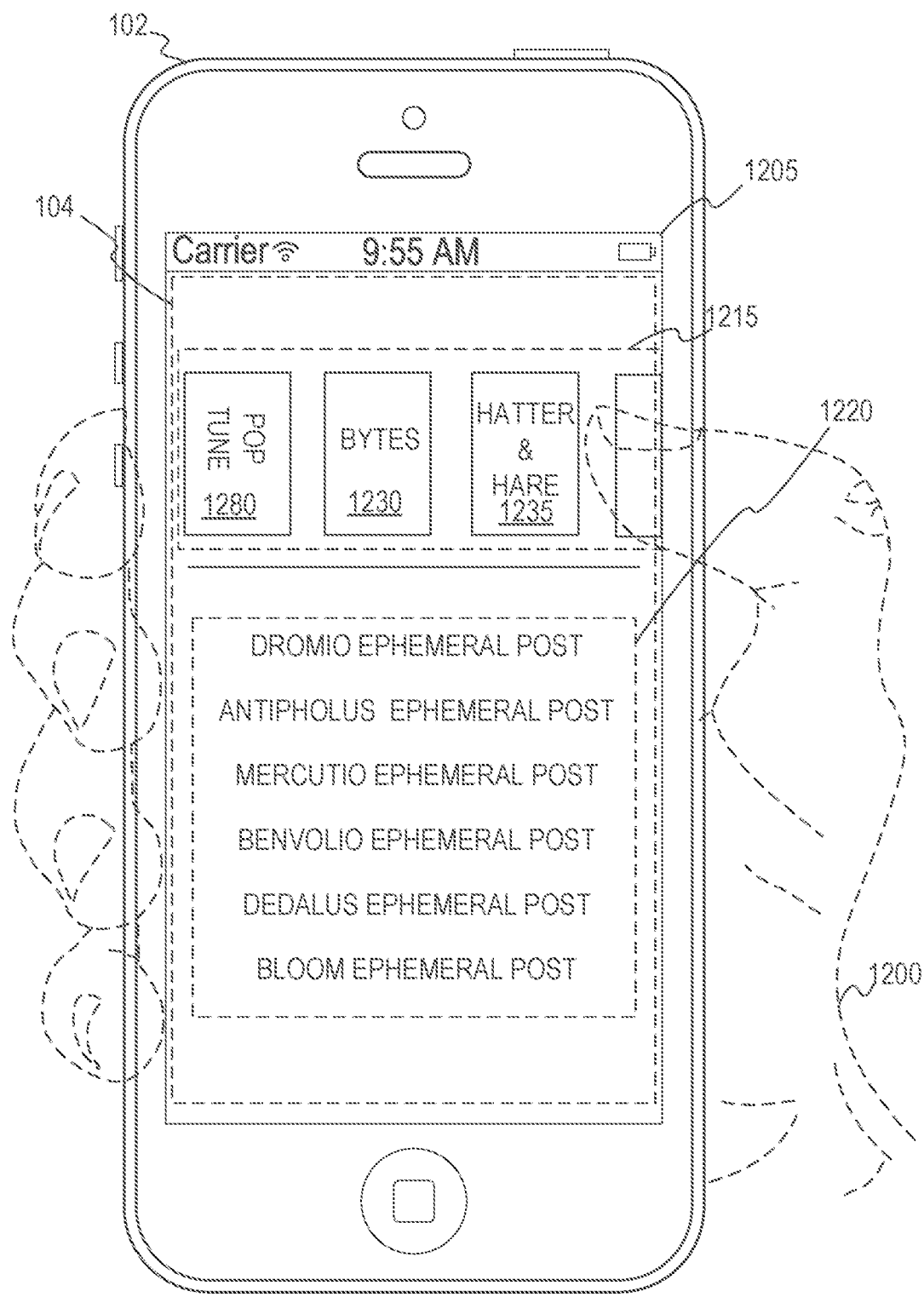

FIGS. 12A-12B show example user interfaces for a joint embedding system, according to some example embodiments. In FIG. 12A, the user 1200 operates a client device 102 executing the application 104, which is displaying stories 1215 (e.g., articles, thumbnails linked to articles or multi-page documents) and user posts 1220. Assuming the user selects content item 1225, then, with reference to FIG. 12B, the content item 1225 is displayed in the application 104 as shown in FIG. 12B. Assuming the user 1200 does not like the content, the user 1200 swipes down (see downward gesture 1240). The downward gesture 1240, the duration of viewing time and other data can be used to update the user embedding as discussed above. In contrast, with reference to FIG. 12C, assume the user selected the second content item 1230 and thoroughly interacts with it (e.g., by swiping up to watch complete video as indicated by upward gesture 1245); the positive interactions can likewise be used to update the user embedding and re-rank or request new content that is nearest to the latest most current user embedding.

With reference to FIG. 121), in response to the updated user embedding, the application 104 (e.g., the system 210 operating within application 104) finds a new content item 1280 (e.g., new nearest neighbor content item) and ranks it first in the stories 1215. The new content item 1280 can be a result of re-ranking the items already stored locally on the client device 102 (e.g., embedding's of the stories and the corresponding story content stored locally), or can be new content received by from the server in an anonymous content request using the user embedding, as discussed above.

Figure 13:
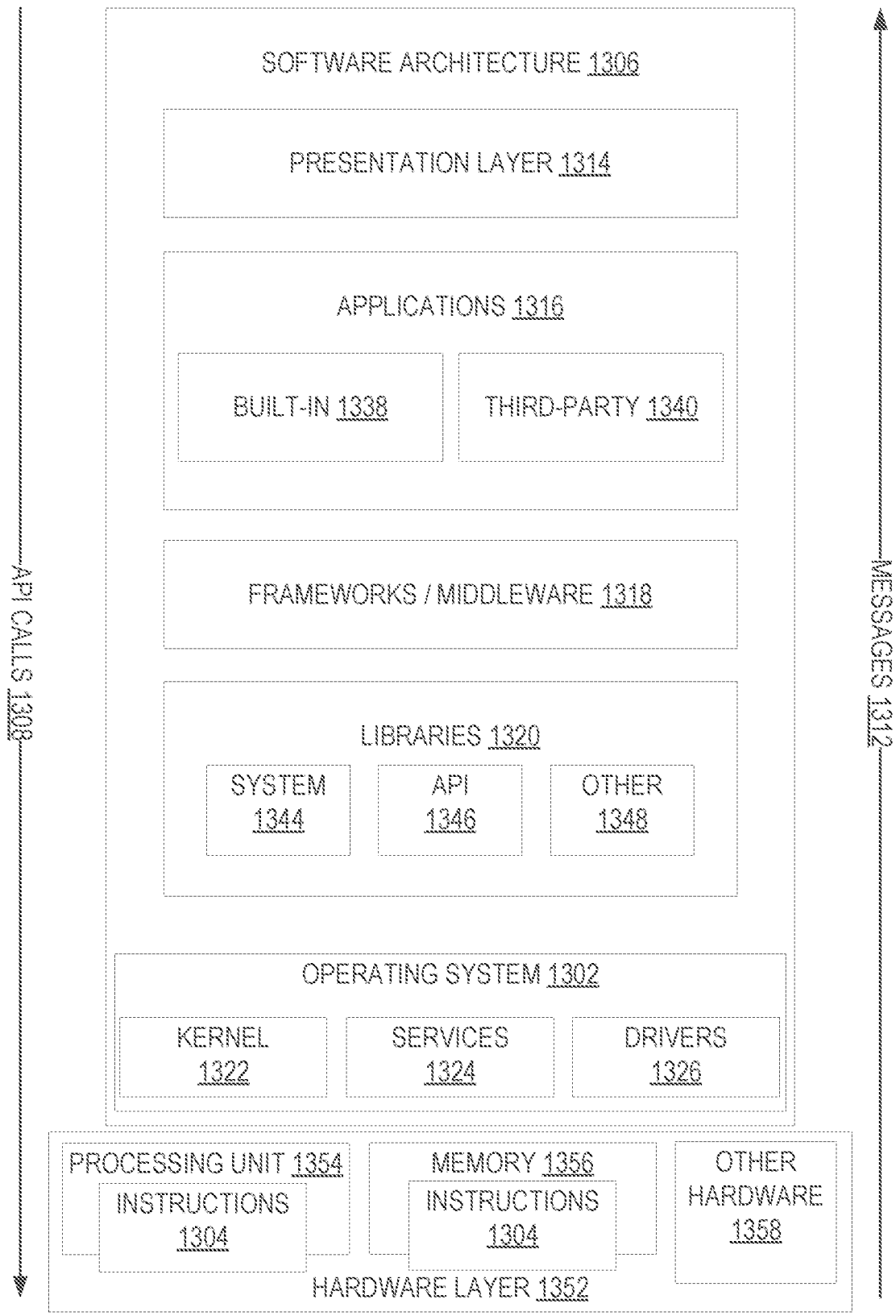
FIG. 13 is a block diagram illustrating a representative software architecture, which may be used in conjunction with various hardware architectures herein described.

FIG. 13 is a block diagram illustrating an example software architecture 1306, which may be used in conjunction with various hardware architectures herein described. FIG. 13 is a non-limiting example of a software architecture, and it will be appreciated that many other architectures may be implemented to facilitate the functionality described herein. The software architecture 1306 may execute on hardware such as a machine 1400 of FIG. 14 that includes, among other things, processors, memory, and I/O components. A representative hardware layer 1352 is illustrated and can represent, for example, the machine 1400 of FIG. 14. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes a memory/storage 1356, which also has the executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1516, and a presentation layer 1313. Operationally, the applications 1516 and/or other components within the layers may invoke API calls 1308 through the software stack and receive a response in the form of messages 1312. The layers illustrated are representative in nature and not all software architectures have all layers. For example, some mobile or special-purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1516 and/or other components and/or layers. The libraries 1320 provide functionality that allows other software components to perform tasks in an easier fashion than by interfacing directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1516 and other software components/modules.

The frameworks/middleware 1318 provide a higher-level common infrastructure that may be used by the applications 1516 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1316 may use built-in operating system functions (e.g., kernel 1322, services 1324, and/or drivers 1326), libraries 1320, and frameworks/middleware 1318 to create user interfaces to interact with users of the system. Alternatively, or additionally, in some systems, interactions with a user may occur through a presentation layer, such as the presentation layer 1313. In these systems, the application/component "logic" can be separated from the aspects of the application/component that interact with a user.

Figure 14:
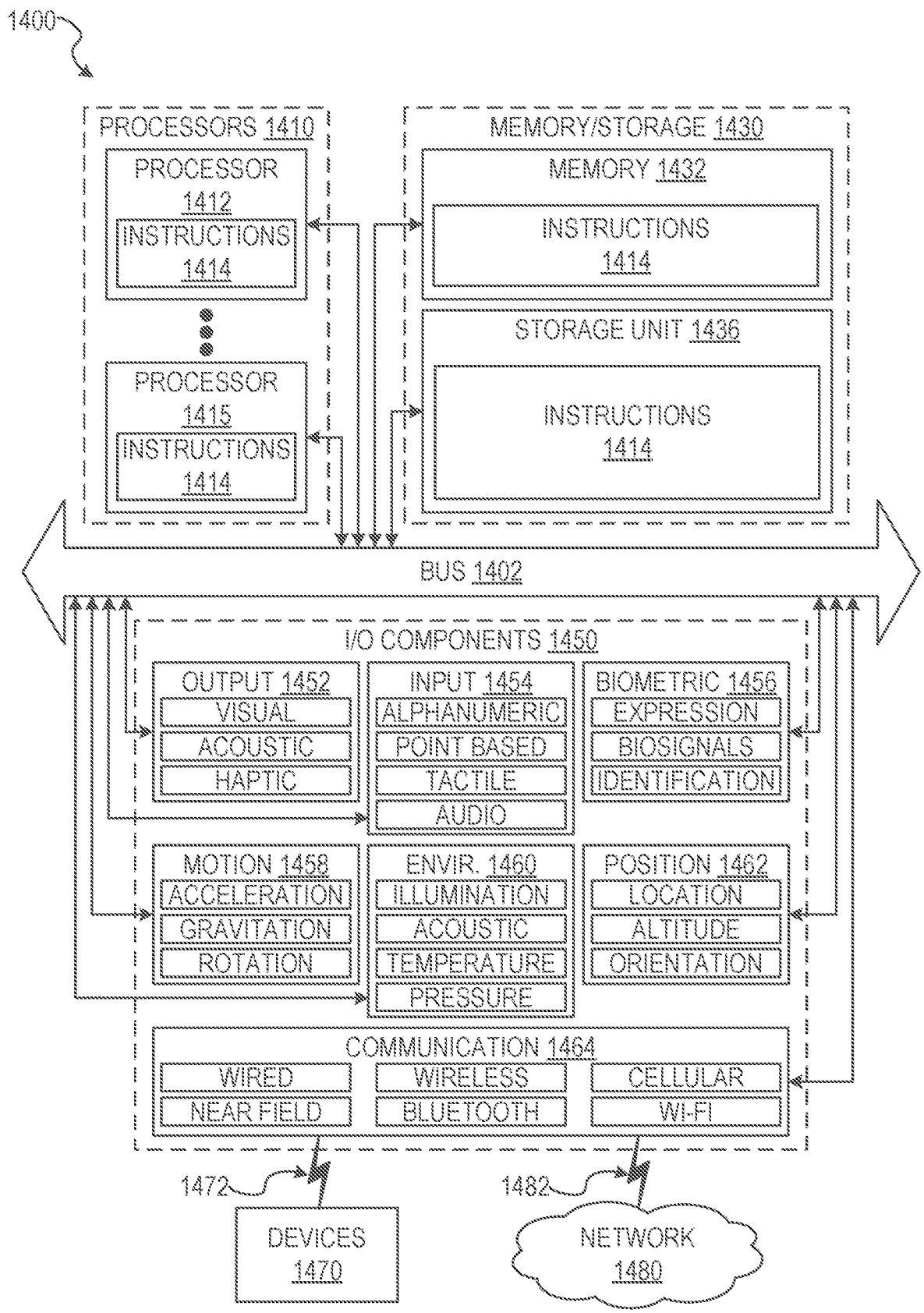
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. As such, the instructions 1414 may be used to implement modules or components described herein. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. The memory/storage 1430 may include a main memory 1432, static memory 1434, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436 (e.g., on machine readable-medium), within at least one of the processors 1410 (e.g., within the processor cache memory accessible to processors 1412 or 1415), or any suitable combination thereof, during execution thereof by the machine 1400. Accordingly, the memory 1432, the storage unit 1436, and the memory of the processors 1410 are examples of machine-readable media.

The I/O components 1450 may include a wide variety of components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environment components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environment components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1416 for execution by the machine 1400, and includes digital or analog communications signals or other intangible media to facilitate communication of such instructions 1416. Instructions 1416 may be transmitted or received over the network 1480 using a transmission medium via a network interface device and using any one of a number of well-known transfer protocols.

"CLIENT DEVICE" in this context refers to any machine 1400 that interfaces to a network 1480 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1480.

"COMMUNICATIONS NETWORK" in this context refers to one or more portions of a network 1480 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1480 may include a wireless or cellular network and the coupling 1482 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting, or a setting specified by the recipient. Regardless of the setting technique, the message 400 is transitory.

"MACHINE-READABLE MEDIUM" in this context refers to a component, a device, or other tangible media able to store instructions 1416 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions 1416 (e.g., code) for execution by a machine 1400, such that the instructions 1416, when executed by one or more processors 1410 of the machine 1400, cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor 1412 or a group of processors 1410) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1400) uniquely tailored to perform the configured functions and are no longer general-purpose processors 1410.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1412 configured by software to become a special-purpose processor, the general-purpose processor 1412 may be configured as respectively different special-purpose processors (e.g., comprising different hardware components) at different times. Software accordingly configures a particular processor 1412 or processors 1410, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1410 that are temporarily configured (e.g., by software) or permanently configured to perform the relevant operations. Whether temporarily or permanently configured, such processors 1410 may constitute processor-implemented components that operate to perform one or more operations or functions described herein. As used herein, "processor-implemented component" refers to a hardware component implemented using one or more processors 1410. Similarly, the methods described herein may be at least partially processor-implemented, with a particular processor 1412 or processors 1410 being an example of hardware. For example, at least some of the operations of a method may be performed by one or more processors 1410 or processor-implemented components. Moreover, the one or more processors 1410 may also operate to support performance of the relevant operations in a "cloud computing" environment or as a "software as a service" (SaaS). For example, at least some of the operations may be performed by a group of computers (as examples of machines 1400 including processors 1410), with these operations being accessible via a network 1480 (e.g., the Internet) and via one or more appropriate interfaces (e.g., an API). The performance of certain of the operations may be distributed among the processors 1410, not only residing within a single machine 1400, but deployed across a number of machines 1400. In some example embodiments, the processors 1410 or processor-implemented components may be located in a single geographic location (e.g., within a home environment, an office environment, or a server farm). In other example embodiments, the processors 1410 or processor-implemented components may be distributed across a number of geographic locations.

"PROCESSOR" in this context refers to any circuit or virtual circuit (a physical circuit emulated by logic executing on an actual processor 1412) that manipulates data values according to control signals (e.g., "commands," "op codes," "machine code," etc.) and which produces corresponding output signals that are applied to operate a machine 1400. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1410 may further be a multi-core processor 1410 having two or more independent processors (sometimes referred to as "cores") that may execute instructions 1416 contemporaneously.

"TIMESTAMP" in this context refers to a sequence of characters or encoded information identifying when a certain event occurred, for example giving date and time of day, sometimes accurate to a small fraction of a second.

What is claimed is:

1. A method performed on a user device, the method comprising:
generating, using a user embedding neural network, a user embedding with user attribute data as a first input and a second input of a user interaction representation, wherein the user embedding neural network is a feed forward (FF) neural network;
receiving an indication of a first user interaction performed on a first content item;
updating, using a recurrent neural network, the user interaction representation based on the first user interaction, the first content item, and a hidden user interaction state;
generating, using the user embedding neural network, an updated user embedding with the user attribute data as a third input and a fourth input of the updated user interaction representation;
identifying one or more content items using the updated user embedding and content embeddings, wherein the content embeddings and the updated user embedding share a joint embedding space, and wherein the content embeddings are generated using a content embeddings neural network, wherein the content embeddings neural network comprises two or more content embedding neural networks, and wherein the user embedding neural network is trained jointly with the two or more content embedding neural networks, the two or more content embedding neural networks corresponding to two or more content types; and storing, on the user device, the identified one or more content items.

2. The method of claim 1, wherein the one or more content items are identified by determining one or more content embeddings of the content embeddings as nearest neighbors to the updated user embedding in the joint embedding space, the one or more content embeddings corresponding to the one or more content items, wherein the one or more content items are input to the content embeddings neural network with the one or more content embeddings as output.

3. The method of claim 2, wherein determining the one or more content embeddings as the nearest neighbors comprises determining one or more distances from the updated user embedding to the one or more content embeddings in the joint embedding space.

4. The method of claim 1 wherein the one or more content items are identified by:

transmitting, to a network platform, a content items request nearest to the updated user embedding; and receiving, from the network platform, the one or more content items as nearest neighbors.

5. The method of claim 1, further comprising:

displaying, on the user device, the one or more content items.

6. The method of claim 1, wherein the first content item and the one or more content items comprise one or more of the following group: an electronic document, an image, a sequence of images, a slide show, a video, and/or an audio file.

7. The method of claim 1, wherein the content embeddings are first content embeddings, wherein the user embeddings neural network is trained jointly with the content embedding neural network, and wherein the training is based on determining distances between a series of user embeddings and second content embeddings, the second content embeddings generated as output from the content embedding neural network with input of second content items in which a user indicated an interest.

8. The method of claim 7 wherein the series of user embeddings are generated based on updating the user embedding based on interactions of the user with the second content items.

9. The method of claim 7 wherein the user is determined to have indicated the interest in the second content items based on the user performing, with each content item of the second content items, one or more of the following group: reading the each content item to completion, viewing the each content item for a duration of time above a threshold duration, bookmarking the each content item, and saving the each content item.

10. The method of claim 9 wherein the training is further based on determining second distances between the series of user embeddings and third content embeddings, the third content embeddings generated as second output from the content embeddings neural network with a second input of third content items in which the user indicated a lack of interest.

11. The method of claim 10 wherein the user is determined to have indicated the lack of interest in the third content items based on the user performing, with each content item of the third content items, one or more of the following group: not selecting the each content item when presented with the each content item, not reading the each content item, viewing the each content item for a duration of time below a threshold duration, and selecting an interface item indicating that the user is not interested in the each content item.

12. A user device comprising:

one or more processors; and a memory storing instructions that, when executed by the one or more processors, cause the one or more processors to perform operations comprising:

generating, using a user embedding neural network, a user embedding with user attribute data as a first input and a second input of a user interaction representation, wherein the user embedding neural network is a feed forward (FF) neural network;

receiving an indication of a first user interaction performed on a first content item;

updating, using a recurrent neural network, the user interaction representation based on the first user interaction, the first content item, and a hidden user interaction state;

generating, using the user embedding neural network, an updated user embedding with the user attribute data as a third input and a fourth input of the updated user interaction representation;

identifying one or more content items using the updated user embedding and content embeddings, wherein the content embeddings and the updated user embedding share a joint embedding space, and wherein the content embeddings are generated using a content embeddings neural network, wherein the content embeddings neural network comprises two or more content embedding neural networks, and wherein the user embedding neural network is trained jointly with the two or more content embedding neural networks, the two or more content embedding neural networks corresponding to two or more content types; and storing, on the user device, the identified one or more content items.

13. The user device of claim 12, wherein the content embeddings are first content embeddings, and wherein the one or more content items are identified by determining one or more second content embeddings as nearest neighbors to the updated user embedding in the joint embedding space, the one or more second content embeddings corresponding to the one or more content items, wherein the one or more content items are input to the content embeddings neural network with the one or more second content embeddings as output.

14. The user device of claim 13, wherein determining the one or more second content embeddings as the nearest neighbors comprises determining one or more distances from the updated user embedding to the one or more second content embeddings in the joint embedding space.

15. The user device of claim 12 wherein the one or more content items are identified by:

transmitting, to a network platform, a content items request nearest to the updated user embedding; and receiving, from the network platform, the one or more content items as nearest neighbors to the updated user embedding.

16. The user device of claim 12 wherein the content embeddings are first content embeddings, wherein the user embedding neural network is trained jointly with the content embeddings neural network, wherein the training is based on determining distances between a series of user embeddings and second content embeddings, the second content embeddings generated as second output from the content embedding neural network with second input of second content items in which a user indicated an interest, and wherein the user is determined to have indicated the interest in the second content items based on the user performing, with each content item of the second content items, one or more of the following group: reading the each content item to completion, viewing the each content item for a duration of time above a threshold duration, bookmarking the each content item, and saving the each content item.

17. The user device of claim 16 wherein the training is further based on determining second distances between the series of user embeddings and third content embeddings, the third content embeddings generated as third output from the content embeddings neural network with third input of third content items in which the user indicated a lack of interest.

18. A non-transitory machine-readable storage device embodying instructions that, when executed by a machine of a user device, cause the machine to perform operations comprising:
  generate, using a user embedding neural network, a user embedding with user attribute data as a first input and a second input of a user interaction representation, wherein the user embedding neural network is a feed forward (FF) neural network;
  receive an indication of a first user interaction performed on a first content item;
  update, using a recurrent neural network, the user interaction representation based on the first user interaction, the first content item, and a hidden user interaction state;
  generate, using the user embedding neural network, an updated user embedding with the user attribute data as a third input and a fourth input of the updated user interaction representation;
  identify one or more content items using the updated user embedding and content embeddings, wherein the content embeddings and the updated user embedding share a joint embedding space, and wherein the content embeddings are generated using a content embeddings neural network, wherein the content embeddings neural network comprises two or more content embedding neural networks, and wherein the user embedding neural network is trained jointly with the two or more content embedding neural networks, the two or more content embedding neural networks corresponding to two or more content types; and
  storing, on the user device, the identified one or more content items.

19. The non-transitory machine-readable storage device of claim 18 wherein the content embeddings are first content embeddings, wherein the user embedding neural network is trained jointly with the content embedding neural network, wherein the training is based on determining distances between a series of user embeddings and second content embeddings, the second content embeddings generated as output from the content embeddings neural network with second input of second content items in which a user indicated an interest, and wherein the user is determined to have indicated the interest in the second content items based on the user performing, with each content item of the second content items, one or more of the following group: reading the each content item to completion, viewing the each content item for a duration of time above a threshold duration, bookmarking the each content item, and saving the each content item.

* * * * *